United States Patent
Yoon

(10) Patent No.: US 8,860,263 B2
(45) Date of Patent: Oct. 14, 2014

(54) LINEAR VIBRATION MOTOR

(75) Inventor: An Soo Yoon, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/554,321

(22) Filed: Jul. 20, 2012

(65) Prior Publication Data

US 2013/0033128 A1 Feb. 7, 2013

(30) Foreign Application Priority Data

Aug. 4, 2011 (KR) ........................ 10-2011-0077883

(51) Int. Cl.
  *H02K 33/00* (2006.01)
  *H02K 33/18* (2006.01)
  *B06B 1/04* (2006.01)
  *H02K 33/16* (2006.01)

(52) U.S. Cl.
  CPC ............... *B06B 1/045* (2013.01); *H02K 33/18* (2013.01); *H02K 33/16* (2013.01)
  USPC .......................................................... 310/25

(58) Field of Classification Search
  None
  See application file for complete search history.

(56) References Cited

U.S. PATENT DOCUMENTS

| 7,038,335 | B2 * | 5/2006 | Choi et al. | 310/12.24 |
| 2005/0184601 | A1 * | 8/2005 | Kweon et al. | 310/36 |
| 2005/0285454 | A1 * | 12/2005 | Choi et al. | 310/14 |
| 2007/0194635 | A1 * | 8/2007 | Miura | 310/15 |
| 2008/0306332 | A1 * | 12/2008 | Choi et al. | 600/38 |
| 2009/0121559 | A1 * | 5/2009 | Lee | 310/28 |
| 2010/0259113 | A1 * | 10/2010 | Lee et al. | 310/23 |
| 2010/0277010 | A1 * | 11/2010 | Jeon | 310/25 |
| 2011/0018364 | A1 * | 1/2011 | Kim et al. | 310/17 |

FOREIGN PATENT DOCUMENTS

| KR | 10-0984046 B | 12/2009 |
| KR | 10-0934584 B | 9/2010 |
| KR | 10-2010-0111368 A | 10/2010 |

OTHER PUBLICATIONS

Office action dated Apr. 25, 2013 for related Korean Patent Application No. 10-2011-0077883 and its English summary provided by the clients.
Office Action dated Sep. 24, 2012 for corresponding Korean Patent Application No. 2011-0077883 and its English summary.

* cited by examiner

*Primary Examiner* — Tran Nguyen
(74) *Attorney, Agent, or Firm* — Ladas & Parry, LLP

(57) ABSTRACT

Disclosed herein is a linear vibration motor including: a stator part including a coil, a printed circuit board coupled to the coil, a bracket having the printed circuit board fixedly coupled thereto, and a case having an internal space formed therein and coupled to the bracket; and a vibrator part including a main magnet positioned to face the coil, a yoke coupled to the magnet, a weight body coupled to an outer peripheral surface of the yoke, and an elastic member having one end coupled to the case and the other end coupled to the yoke, wherein the stator part further includes sub-magnets, which are magnetic damping units, the sub-magnets being disposed to face the main magnet of the vibrator part and being mounted in the stator part so that surfaces thereof facing the main magnet have the same polarities as those of the main magnet.

16 Claims, 3 Drawing Sheets

LINEAR VIBRATION MOTOR

CROSS REFERENCE TO RELATED APPLICATION

This application claims the benefit of Korean Patent Application No. 10-2011-0077883, filed on Aug. 4, 2011, entitled "Linear Motor", which is hereby incorporated by reference in its entirety into this application.

BACKGROUND OF THE INVENTION

1. Technical Field

The present invention relates to a linear vibration motor.

2. Description of the Related Art

A general vibration motor, which is a component converting an electrical energy into mechanical vibration using a principle of generating electromagnetic force, is mounted in a mobile communication terminal, a portable terminal, and the like, to be used for silently notifying a user of call reception.

Further, in a situation in which small-sized and high quality components are required in a mobile communication terminal in accordance with the trend in which a multi-functional mobile communication terminal has been prominent due to the rapid expansion in wireless communication and mobile phone markets, performance and a technology of a vibration motor has also been developed daily in order to overcome a disadvantage of an existing product and significantly improve quality.

In addition, as the release of a cellular phone having a large-sized liquid crystal display (LCD) screen has rapidly increased in recent years, a touch screen scheme has been used. As a result, the vibration motor has been used to generate vibration at the time of touch, such that the demand thereof has increased.

Meanwhile, performance particularly required in the vibration according to the touch of the touch screen is as follows. First, as the number of vibration generation according to the touch becomes larger than that of vibration generation at the time of call reception, an operation lifespan time needs to increase. Second, in order to allow users to feel the vibration at the time of touch, a response speed of the vibration needs to increase in accordance with a touch speed of the screen.

A linear vibration motor, which is a vibration motor capable of satisfying the above-mentioned characteristics, has a resonant frequency determined by a spring and a vibrator part connected to the spring and is excited by electromagnetic force to thereby generate vibration. In addition, the electromagnetic force is generated by the interaction between a magnet of the vibrator part and a current applied to a coil of a stator part and having a predetermined frequency.

In the case of the linear vibration motor configured as described above, as the vibrator part moves vertically, it collides with a case or a bracket to thereby cause touch noise. In order to prevent the above-mentioned problem, a ring shaped band has been formed by applying MF or a damping material (a rubber, Poron, or the like) has been used.

However, when the MF is used, the MF is made of liquid to be scattered to the surroundings at the time of excessive impact, such that it is separated from its position. Therefore, a damping function is weakened, such that noise is generated at the time of a vibration operation. In addition, the damping material such as the rubber, the Poron, or the like, occupies a predetermined volume, such that it may not be easily disposed in a limited space and a degree of freedom in design is degraded.

SUMMARY OF THE INVENTION

The present invention has been made in an effort to provide a linear vibration motor in which magnets are mounted in a stator part and a vibrator part and a magnetic damping unit is implemented by repulsive force between the magnets to block friction due to contact between the stator part and the vibrator part, such that metallic high frequency noise and uniform vibration force may be generated.

According to a first preferred embodiment of the present invention, there is provided a linear vibration motor including: a stator part having an internal space, with a coil mounted to the stator; a vibrator part comprising a main magnet disposed at a position facing the coil, the vibrator being received in the internal space of the stator; an elastic member connecting the stator to the vibrator; wherein the stator part further includes sub-magnets, which are magnetic damping units, the sub-magnets being disposed to face the main magnet of the vibrator part and being mounted in the stator part so that surfaces thereof facing the main magnet have the same polarities as those of the main magnet.

The stator part including a printed circuit board coupled to the coil, a bracket having the printed circuit board fixedly coupled thereto, and a case having an internal space formed therein and coupled to the bracket; and the vibrator part including a yoke coupled to the magnet, a weight body coupled to an outer peripheral surface of the yoke.

The sub-magnets may include: a first sub-magnet mounted on an upper surface of the bracket facing the main magnet; and a second sub-magnet mounted on an inner side of the case facing the main magnet.

According to a second preferred embodiment of the present invention, there is provided a linear vibration motor including: a stator part having an internal space, with a main magnet mounted to the stator; a vibrator part comprising a coil disposed at a position facing the magnet, the vibrator being received in the internal space of the stator part; and an elastic member connecting the stator to the vibrator; wherein the stator part and the vibrator part each further include sub-magnets, which are magnetic damping units, the sub-magnets being disposed so that the same polarities face each other.

The stator part including a bracket, and a case having an internal space formed therein and coupled to the bracket; and the vibrator part including a weight body coupled to the coil, a printed circuit board having one end coupled to the coil and the other end coupled to the bracket, and the main magnet includes a first main magnet coupled to an inner side upper surface of the bracket and a second main magnet facing the first main magnet and coupled to an inner side of the case.

The sub-magnets may include: a plurality of first sub-magnets mounted on an upper surface of the bracket and mounted on an inner side of the case or the elastic member; and a plurality of second sub-magnets each mounted on upper and lower surfaces of the weight body so as to face the plurality of first sub-magnets.

The first and second main magnets may be configured so that surfaces thereof facing each other have the same polarity.

The stator part may further include a plate yoke selectively coupled to an upper portion of the first main magnet or a lower portion of the second main magnet.

The stator part may further include a magnetic fluid applied to an outer peripheral surface of the plate yoke.

The printed circuit board may include: a coupling plate fixedly coupled to the stator part; an elastic part extended from the coupling plate in a spiral direction so as to have elastic force; and a contact part provided at an end portion of the elastic part and coupled to the coil to thereby apply an external power.

The vibrator part may further include a cylindrical yoke coupled between the coil and the weight body and increasing a magnetic flux of the magnet, and the elastic member may have one end coupled to the stator part and the other end coupled to the coil and the weight body through the cylindrical yoke.

The weight body may include a hollow part formed therein, wherein the hollow part receives the cylindrical yoke and the coil therein.

The elastic member and the coil may include hollow parts formed therein so as to be linearly movable in a state in which the stator part is contained therein.

The printed circuit board may be a flexible printed circuit (FPC) having elasticity.

According to a third preferred embodiment of the present invention, there is provided a linear vibration motor including: a stator part having an internal space, with a coil mounted to the stator; a vibrator part comprising a main magnet disposed at a position facing the coil, the vibrator being received in the internal space of the stator; an elastic member connecting the stator to the vibrator; wherein the main magnet includes a first main magnet coupled to an inner side upper surface of the bracket and a second main magnet facing the first main magnet and coupled to an inner side of the case, wherein the stator part and the vibrator part each further include sub-magnets, which are magnetic damping units, the sub-magnets being disposed so that the same polarities face each other, and wherein the stator part further includes a damping member mounted on an inner side of the case facing the elastic member.

The sub-magnets may include: a plurality of first sub-magnets mounted on an upper surface of the bracket and mounted on an inner side of the case or the elastic member; and a plurality of second sub-magnets each mounted on upper and lower surfaces of the weight body so as to face the plurality of first sub-magnets.

The first and second main magnets may be configured so that surfaces thereof facing each other have the same polarity.

The stator part may further include a plate yoke selectively coupled to an upper portion of the first main magnet or a lower portion of the second main magnet.

The printed circuit board may include: a coupling plate fixedly coupled to the stator part; an elastic part extended from the coupling plate in a spiral direction so as to have elastic force; and a contact part provided at an end portion of the elastic part and coupled to the coil to thereby apply an external power.

The vibrator part may further include a cylindrical yoke coupled between the coil and the weight body and increasing a magnetic flux of the magnet, and the elastic member may have one end coupled to the stator part and the other end coupled to the coil and the weight body through the cylindrical yoke.

DESCRIPTION OF THE PREFERRED EMBODIMENTS

Figure 1:
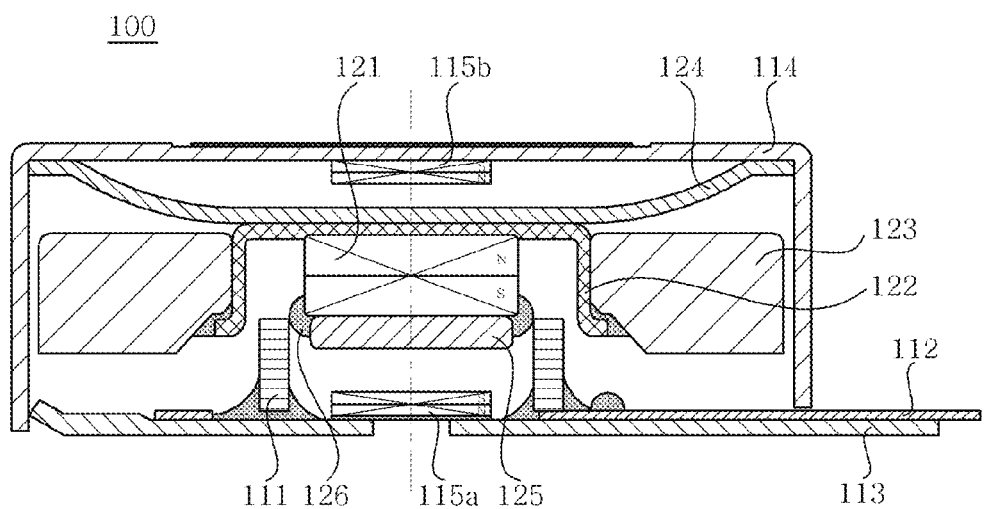
FIG. 1 is a schematic cross-sectional view of a linear vibration motor according to a first preferred embodiment of the present invention.

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, a linear vibration motor according to preferred embodiments of the present invention will be described in detail with reference to the accompanying drawings.

FIG. 1 is a schematic cross-sectional view of a linear vibration motor according to a first preferred embodiment of the present invention. As shown, a linear vibration motor 100 according to a first preferred embodiment of the present invention includes a stator part and a vibrator part, wherein the stator part includes a coil 111, a printed circuit board 112, a bracket 113, a case 114, and sub-magnets 115a and 115b.

More specifically, the coil 111 is positioned to stand on the bracket 113 and is coupled to the printed circuit board 112. In addition, the printed circuit board 112 is fixedly coupled to the bracket 113, and the case 114 includes an inner space formed therein so as to cover the vibrator part and is coupled to the bracket 113. Further, the sub-magnets 115a and 115b, which are magnetic damping units, include a first sub-magnet 115a mounted on an upper surface of the bracket 113 so as to face a main magnet 121 of the vibrator part and a second sub-magnet 115b mounted on an inner side of the case 114. In addition, the sub-magnets 115a and 115b are mounted so that surfaces thereof facing the main magnet have the same polarities as those of the main magnet, thereby making it possible to obtain a magnetic damping effect due to repulsive force with the main magnet.

In the case of FIG. 1, for example, when the main magnet 121 is disposed so that a surface thereof facing the case 114 is magnetized as an N pole and a surface thereof facing the bracket is magnetized as an S pole, the first magnet 115a is disposed so that a surface thereof facing the main magnet 121 becomes an S pole, and the second magnet 115b is disposed so that a surface thereof facing the main magnet 121 becomes an N pole.

Next, the vibrator part includes the main magnet 121, a yoke 122, a weight body 123, an elastic member 124, and a plate yoke 125. More specifically, the main magnet 121 is positioned at an inner side of the coil 111 of the stator part and is positioned to face the sub-magnets 115a and 115b. In addition, the main magnet 121 and the sub-magnets 115a and 115b are disposed so that surfaces thereof facing each other have the same polarities in order to allow repulsive force to act therebetween. Further, the yoke 122 is coupled to an upper portion of the main magnet 121, and the weight body 122 is coupled to an outer peripheral surface of the yoke 423. In addition, the elastic member 124 has one end coupled to an inner side of the case 114 of the stator part and the other end coupled to the yoke 122. Further, the vibrator part may further include a magnetic fluid 126 applied to outer peripheral portions of the plate yoke 125 and the main magnet 121 and adjacent to the coil 111. The magnetic fluid 126 is applied for damping so that friction due to contact between the vibrator part and the coil of the stator part is not generated.

Through the above-mentioned configuration, when an external power is supplied to the coil 111 through the printed circuit board 112, the vibrator part vibrates linearly by electromagnetic force between the coil 111 and the main magnet 121. Here, when a displacement of the vibrator part 420 increases, the repulsive force acts between the main magnet 121 and the sub-magnets 115a and 115b, such that the friction due to the contact between the vibrator part and the stator part is blocked, thereby making it possible to alleviate metallic high frequency noise and generate uniform vibration force.

Figure 2:
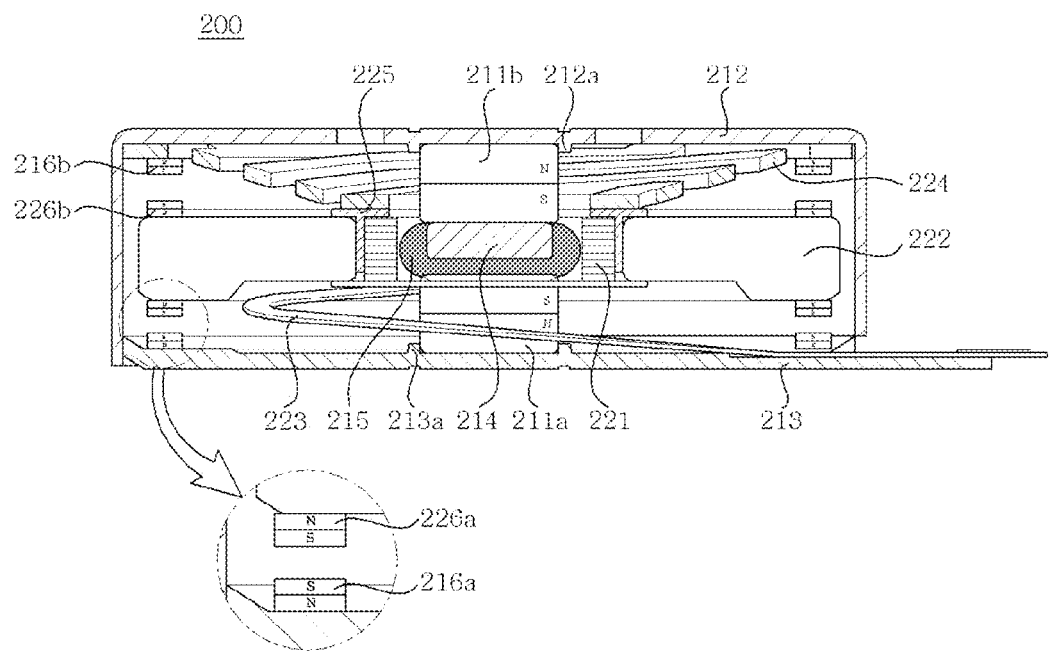
FIG. 2 is a schematic cross-sectional view of a linear vibration motor according to a second preferred embodiment of the present invention.
Figure 3:
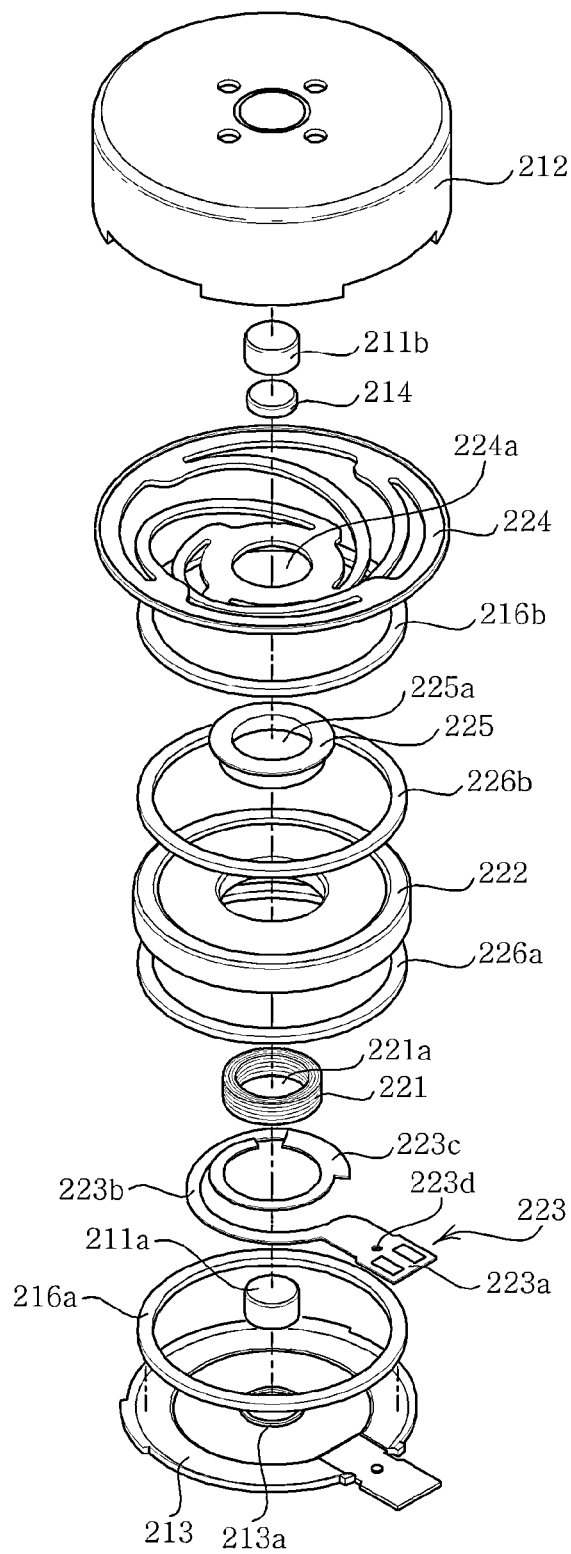
FIG. 3 is a schematic exploded perspective view of the linear vibration motor shown in FIG. 2.

FIG. 2 is a schematic cross-sectional view of a linear vibration motor according to a second preferred embodiment of the present invention; and FIG. 3 is a schematic exploded perspective view of the linear vibration motor shown in FIG. 2. As shown, a linear vibration motor 200 includes a stator part and a vibrator part, wherein the stator part includes main magnets 211a and 211b, a case 212, a bracket 213, a plate yoke 214, a magnetic fluid 215, and first sub-magnets 216a and 216b, and the vibrator part includes a coil 221, a weight body 222, a printed circuit board 223, an elastic member 224, a cylindrical yoke 225, and second sub-magnets 226a and 226b.

More specifically, the case 212 of the stator part includes an inner space formed therein so as to cover the vibrator part and is coupled to the bracket 213. In addition, the bracket 213 is fixedly coupled to the printed circuit board 223. Further, the main magnets 211a and 211b, which linearly vibrates the vibrator part by electromagnetic force with the coil, includes a first main magnet 211a coupled to an inner side upper surface of the bracket 213 and a main second magnet 211b coupled to an inner side of the case 212. In addition, the first main magnet 211a and the second main magnet 211b may be configured so that surfaces thereof facing each other have the same polarity in order to increase magnetic efficiency.

Further, each of the case 212 and the bracket 213 includes seat parts 212a and 213a formed in order to couple the first and second main magnets 211a and 211b to the center thereof. More specifically, the seat part 212a is formed on an inner side of the case, and the seat part 213a is formed on an upper surface of the bracket 213 facing the seat part 212a.

In addition, the plate yoke 214 may be selectively coupled to an upper portion of the first main magnet 211a or a lower portion of the second main magnet 211b. FIG. 2 shows an example in which the plate yoke 214 is coupled to the upper portion of the first main magnet 211a. Further, the magnetic fluid 215 for damping is applied to an outer peripheral surface of the plate yoke 214 facing the coil so that friction due to contact between the plate yoke 214 and the coil of the vibrator part to be described below is not generated.

In addition, the first sub-magnets 216a and 216b includes a plurality of magnets, have a circular band shape, and are disposed at both sides based on the weight body 222, which is the vibrator part, as shown in FIG. 3. More specifically, the first sub-magnet 216a is mounted on an upper surface of the bracket 213 facing the weight body, and the first sub-magnet 216b is mounted on an inner side of the case 212 facing the weight body or the elastic member 224.

Next, the coil 221, which is the vibrator part, is disposed to face the main magnets 211a and 211b, the weight body 222 is coupled to the coil 221, and the printed circuit board 223 has one end coupled to the coil 221 and the other end coupled to the bracket 213. In addition, the elastic member 224 has one end coupled to the case 212 and the other end coupled to the coil 221.

Further, the printed circuit board 223 includes a coupling plate 223a fixedly coupled to the bracket 213, an elastic part 223b extended from the coupling plate 223a in a spiral direction so as to have elastic force, and a contact part 223c provided at an end portion of the elastic part 223b and coupled to the coil to thereby apply an external power, as shown in FIG. 3.

In addition, the coupling plate 223a of the printed circuit board 223 is provided with a fixing groove 223d for fixing the printed circuit board 223 to the bracket 213, and the bracket 213 is provided with a fixing protrusion 223d corresponding to the fixing groove 223d. Further, the contact part 223c of the printed circuit board may have a disk shape so as to correspond to a shape of a size of the coil, which is a contact object.

Through the above-mentioned configuration, the printed circuit board 223 is extended in the spiral direction while enclosing an outer side of the first main magnet 211a so as to receive the first main magnet 211a therein to be coupled to the coil 211, thereby applying a current to the coil 221 simultaneously with elastically supporting the vibrator part under the vibrator part. To this end, the printed circuit board 223 may have a spring shape extended in the spiral direction and a coil spring shape.

In addition, the cylindrical yoke 225, which prevents leakage of the electromagnetic force generated between the main magnet and the coil to the outside, is coupled between the coil 221 and the weight body 222. Further, the cylindrical yoke 226 may be coupled to an upper portion of the weight body 222 and be fitted into a hollow part 222a of the weight body.

In addition, the elastic member 224 may be coupled to the coil 221 and the weight body 222 through the cylindrical yoke 225.

Further, the weight body 222 includes the hollow part 222a formed therein, wherein the hollow part 222a receives the cylindrical yoke 225 and the coil 221 therein and allows linear movement to be performed in a state in which the main magnets 211a and 211b and the plate yoke 214 are contained therein.

In addition, each of the elastic member 224, the cylindrical yoke 225, and the coil 221 includes hollow parts 224a, 225a, and 221a formed therein so as to be linearly movable in a state in which the main magnets 211a and 211b, the plate yoke 214, and the magnetic fluid 215 are contained therein.

Further, the second sub-magnets 226a and 226b includes a plurality of magnets, have a circular band shape, and are disposed on upper and lower surfaces of the weight body 222 so as to face each of the first sub-magnets 216a and 216b of the stator part, as shown in FIG. 3. In addition, the first sub-magnets 216a and 216b and the second sub-magnets 226a and 226b are magnetized so that surfaces thereof facing each other have the same polarities in order to allow repulsive force to act therebetween.

Further, the printed circuit board 223 according to the preferred embodiment of the present invention may be a flexible printed circuit (FCP) having elasticity.

Through the above-mentioned configuration, when an external power is supplied to the coil 221 through the printed circuit board 223 of the linear vibration motor 200 according to the second preferred embodiment of the present invention, the vibrator part vibrates linearly by electromagnetic force between the coil 221 and the main magnets 211a and 211b. Here, when a displacement of the vibrator part increases, friction due to contact between the weight body 222 and the elastic member 224 or between the weight body 222 and the bracket 213 is blocked by the repulsive force between the first sub-magnets 216a and 216b and the second sub-magnets 226a and 226b, which are magnetic damping units, thereby making it possible to alleviate metallic high frequency noise and generate uniform vibration force.

Figure 4:
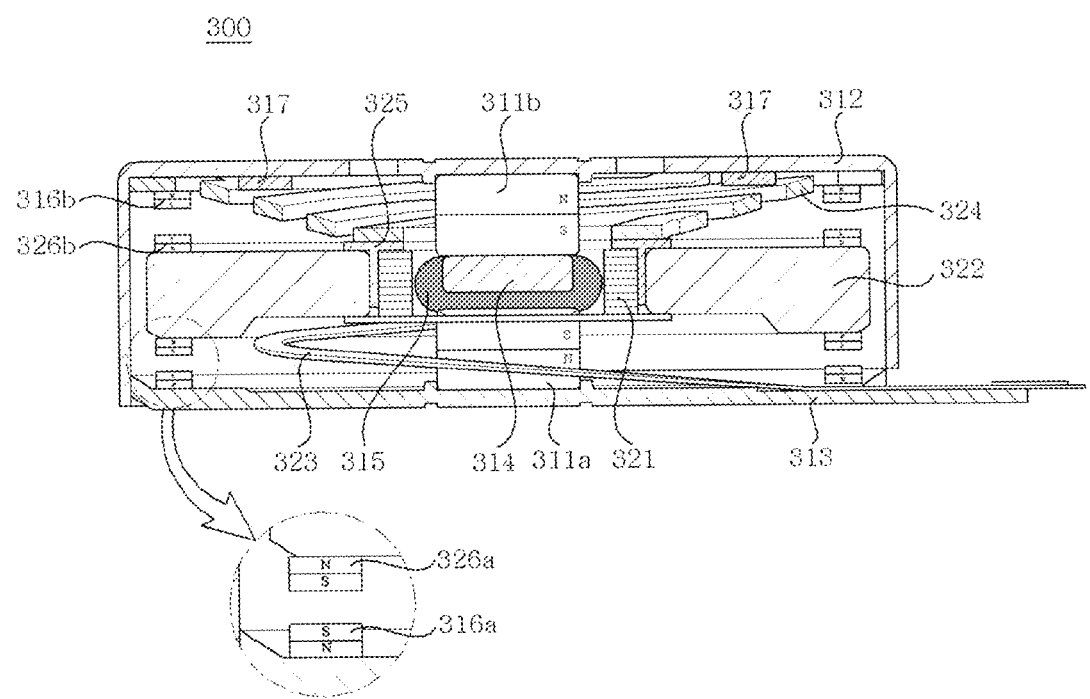
FIG. 4 is a schematic cross-sectional view of a linear vibration motor according to a third preferred embodiment of the present invention.

FIG. 4 is a schematic cross-sectional view of a linear vibration motor according to a third preferred embodiment of the present invention. As shown, a linear vibration motor 300 has the same technical configuration as that of the linear vibration motor 200 according to the second preferred embodiment shown in FIG. 3 except that it further includes a damping member 317.

More specifically, the linear vibration motor 300 includes a stator part and a vibrator part, wherein the stator part includes main magnets 311a and 311b, a case 312, a bracket 313, a plate yoke 314, a magnetic fluid 315, and first sub-magnets 316a and 316b, and the vibrator part includes a coil 321, a weight body 322, a printed circuit board 323, an elastic member 324, a cylindrical yoke 325, and second sub-magnets 326a and 326b.

In addition, the stator part further includes the damping member 317 mounted on an inner side of the case 312 facing the elastic member 324.

Through the above-mentioned configuration, friction due to contact between the case 312 and the elastic member 324 is blocked by the damping member 317 as well as the first sub-magnets 316a and 316b and the second sub-magnets 326a and 326b, which are magnetic damping units, thereby making it possible to alleviate metallic high frequency noise and increase a degree of freedom in design through space utilization.

As set forth above, according to the preferred embodiment of the present invention, it is possible to provide a linear vibration motor in which magnets are mounted in a stator part and a vibrator part and a magnetic damping unit is implemented by repulsive force between the magnets to block friction due to contact between the stator part and the vibrator part, such that metallic high frequency noise and uniform vibration force may be generated.

Although the preferred embodiments of the present invention have been disclosed for illustrative purposes, they are for specifically explaining the present invention and thus a linear vibration motor according to the present invention is not limited thereto, but those skilled in the art will appreciate that various modifications, additions and substitutions are possible, without departing from the scope and spirit of the invention as disclosed in the accompanying claims.

What is claimed is:

1. A linear vibration motor comprising:
   a stator part having an internal space, with a main magnet mounted to the stator;
   a vibrator part comprising a coil disposed at a position facing the magnet and a printed circuit board, the vibrator being received in the internal space of the stator part; and
   an elastic member connecting the stator to the vibrator;
   wherein the stator part and the vibrator part each further include sub-magnets that are magnetic damping units, the sub-magnets being disposed so that the same polarities face each other,
   wherein the stator part includes a bracket, and a case has an internal space formed therein and coupled to the bracket, and
   wherein the sub-magnets include:
      a plurality of first sub-magnets mounted on an upper surface of the bracket and mounted on an inner side of the case or the elastic member; and
      a plurality of second sub-magnets each mounted on upper and lower surfaces of the weight body so as to face the plurality of first sub-magnets.

2. The linear vibration motor as set forth in claim 1, wherein the vibrator part including a weight body coupled to the coil, a printed circuit board having one end coupled to the coil and the other end coupled to the bracket, and the main magnet includes a first main magnet coupled to an inner side upper surface of the bracket and a second main magnet facing the first main magnet and coupled to an inner side of the case.

3. The linear vibration motor as set forth in claim 1, wherein the first and second main magnets are configured so that surfaces thereof facing each other have the same polarity.

4. The linear vibration motor as set forth in claim 1, wherein the stator part further includes a plate yoke selectively coupled to an upper portion of the first main magnet or a lower portion of the second main magnet.

5. The linear vibration motor as set forth in claim 1, wherein the stator part further includes a magnetic fluid applied to an outer peripheral surface of the plate yoke.

6. The linear vibration motor as set forth in claim 1, wherein the printed circuit board includes:
   a coupling plate fixedly coupled to the stator part;
   an elastic part extended from the coupling plate in a spiral direction so as to have elastic force; and
   a contact part provided at an end portion of the elastic part and coupled to the coil to thereby apply an external power.

7. The linear vibration motor as set forth in claim 1, wherein the vibrator part further includes a cylindrical yoke coupled between the coil and the weight body and increasing a magnetic flux of the magnet, and
   the elastic member has one end coupled to the stator part and the other end coupled to the coil and the weight body through the cylindrical yoke.

8. The linear vibration motor as set forth in claim 7, wherein the weight body includes a hollow part formed therein, the hollow part receiving the cylindrical yoke and the coil therein.

9. The linear vibration motor as set forth in claim 5, wherein the elastic member and the coil include hollow parts formed therein so as to be linearly movable in a state in which the stator part is contained therein.

10. The linear vibration motor as set forth in claim 1, wherein the printed circuit board is a flexible printed circuit (FPC) having elasticity.

11. A linear vibration motor, comprising:
   a stator part having an internal space, with a coil mounted to the stator;
   a vibrator part comprising a main magnet disposed at a position facing the coil and a printed circuit board, the vibrator being received in the internal space of the stator;
   an elastic member connecting the stator to the vibrator;
   wherein the main magnet includes a first main magnet coupled to an inner side upper surface of the bracket and a second main magnet facing the first main magnet and coupled to an inner side of the case,
   wherein the stator part includes a bracket, and a case has an internal space formed therein and coupled to the bracket, wherein the stator part and the vibrator part each further include sub-magnets that are magnetic damping units, the sub-magnets being disposed so that the same polarities face each other, and wherein the stator part further includes a damping member mounted on an inner side of the case facing the elastic member.

12. The linear vibration motor as set forth in claim 11, wherein the sub-magnets include:

a plurality of first sub-magnets mounted on an upper surface of the bracket and mounted on an inner side of the case or the elastic member; and a plurality of second sub-magnets each mounted on upper and lower surfaces of the weight body so as to face the plurality of first sub-magnets.

13. The linear vibration motor as set forth in claim 11, wherein the first and second main magnets are configured so that surfaces thereof facing each other have the same polarity.

14. The linear vibration motor as set forth in claim 11, wherein the stator part further includes a plate yoke selectively coupled to an upper portion of the first main magnet or a lower portion of the second main magnet.

15. The linear vibration motor as set forth in claim 11, wherein the printed circuit board includes:

a coupling plate fixedly coupled to the stator part;

an elastic part extended from the coupling plate in a spiral direction so as to have elastic force; and a contact part provided at an end portion of the elastic part and coupled to the coil to thereby apply an external power.

16. The linear vibration motor as set forth in claim 11, wherein the vibrator part further includes a cylindrical yoke coupled between the coil and the weight body and increasing a magnetic flux of the magnet, and the elastic member has one end coupled to the stator part and the other end coupled to the coil and the weight body through the cylindrical yoke.

* * * * *